United States Patent Office 3,078,172
Patented Feb. 19, 1963

3,078,172
PREPARED FROZEN FOOD FOR COOKING AND
METHOD OF PREPARING THE SAME
Louis L. Libby, Forest Hills, N.Y., assignor to Tra-Way
Corp., New York, N.Y., a corporation of New York
No Drawing. Filed June 9, 1959, Ser. No. 819,001
18 Claims. (Cl. 99—192)

This invention relates to a frozen food product and to the method of preparing the same, and more particularly it pertains to a novel frozen uncooked food product and to the method of preparing the same whereby it contains excellent flavor and possesses exceptional preserving qualities.

This application is a continuation-in-part of my copending application Serial No. 537,735, filed September 30, 1955 (now abandoned).

In view of the considerable interest in prepared frozen food, experimental work was undertaken in an effort to determine the best products and methods of making the same. Pursuant thereto, fish fillets were first coated with a batter of milk, eggs and seasoning and then coated with bread crumbs before deep-frying the same in fat at a temperature of about 360° F. The fried product was cooled, packaged and frozen. A sample of the frozen fillets was placed in a baking pan and heated in an oven for a period of 15 minutes at a temperature of about 425° F. It was found that the product had a taste which is characteristic of any food which has been warmed following a previous cooking treatment. From the standpoint of the process it was also found that expensive fats are required in order to cook the raw fillets at the high temperature of 360°– 380° F. During cooking of the food, the oil does deteriorate or break up, thereby resulting in free fatty acid and darkening of color. With such a result, the cooked food containing such oil or fat may develop off-odors and/or flavors. On the basis of the quality of the prepared food, it was decided that this procedure is not satisfactory.

In another experiment, an uncooked fish fillet was first frozen solid and then submerged in hot or boiling water to thaw the outer region of the food, and thereafter the thawed fish was coated with oil before refreezing. The main purpose of the oil coat was to preserve the fish. After the frozen fish was cooked in the hereinabove described manner, it was found that the taste was not particularly good, indicating that a considerable quantity of the natural juices of the fish was lost during the thawing procedure. Furthermore, it is apparent that the thawing procedure is difficult to control, that is, thawing only the outer region of the food for penetration of the oil. After considerable investigation, a successful method was discovered unexpectedly for producing a novel frozen product which has excellent flavor and possesses exceptional preserving quality.

An object of this invention is to provide a process for producing an uncooked frozen food product having exceptional preserving quality and excellent flavor.

Another object of this invention is to provide a novel frozen food product which contains excellent flavor and will preserve for an exceptionally long period of time.

Other objects and advantages of this invention will become apparent from the following description and explanation thereof.

In accordance with this invention, the novel frozen food product is prepared by first coating the uncooked food, frozen or not frozen, with an edible sealing material selected from the group consisting of flour and batter, coating the sealed uncooked food with an edible cooking material selected from the group consisting of an oil and a fat at a temperature at which the cooking material is maintained in a fluid condition without degradation thereof and such that the food remains uncooked, and, if required, freezing the cooking material coated food at a temperature sufficient to solidify the cooking material thereon.

The present invention is applicable to a broad range of uncooked foods, including foods of animal and vegetable origin. In regard to the foods of animal origin, the invention is particularly applicable for processing seafoods, e.g. cod, halibut, etc.; poultry, e.g. chicken, turkey, duck, etc.; meats, e.g. beef, pork, mutton, etc. In the case of foods of vegetable origin, onions and potatoes can be readily processed in the manner proposed hereunder to obtain excellent products.

In regard to all foods of animal origin as well as onions, the uncooked food is coated with a sealing material such as flour and/or batter for the purpose of coating the same with a material which will prevent the natural juices from flowing out of the food. The sealing material is edible, and it also serves to impart flavor to the food upon being cooked. The flour can be, for example, white flour or wheat, rye, or corn origin, or whole wheat flour. The batter consists of egg, milk and seasoning, with or without flour. The seasoning can be salt, pepper or any other material which will impart the desired flavoring effect to the food. In regard to potatoes, it is noted that the use of a sealing material is not necessary for the reason that the loss of moisture from the potatoes is not important. "Batter" means any coating used in the trade, such as egg, milk, flour, etc. that can be applied for the purpose of sealing juices within the food. The sealing of food with flour and/or batter should be effected at a temperature at which the food is not cooked at all, since the purpose of this invention is to prepare a frozen food product which is in an uncooked condition.

After the food has been sealed with flour and/or batter, it may be coated with bread crumbs, cereal crumbs, flour or other coating materials. The coated food is then immersed in a cooking material such as oil or fat of the edible type. For the purpose of this specification and the appended claims, an "edible" oil or fat excludes those of mineral origin. The cooking material should be of animal or vegetable origin and it can have a wide range of melting point. It is important that the melting point of the cooking material fall below the temperature at which the food is to be coated in order that it can be maintained in a fluid condition during the coating operation. Similarly, the cooking material should have a setting point which will permit solidification thereof at temperatures normally employed for storage. Generally, the cooking material is liquid at temperatures ranging from about 110° F. to about 375° F. and its setting point is about 32° F. or higher. The coating operation is conducted at temperatures from about 110° F. to about 375° F. for a period of about 5 to about 40 seconds, preferably about 15 to about 30 seconds. The actual time and temperature conditions employed vary with the food product to be treated and with the physical state of the food product. For example, a vegetable will usually be subjected to different time and temperature conditions than a meat or poultry. Likewise, a frozen uncooked fish will be subjected to different time and temperature conditions than fresh uncooked fish at room temperature. The temperature of the coating material is preferably such that the product to be treated has deposited thereon only a thin coating of cooking material. If the cooking material is maintained at too low a temperature and a frozen product such as frozen fish sticks is passed through the cooking material, the temperature of the cooking material will be lowered and instead of the fish sticks having a thin coating deposited thereon, they will be coated with a thick coating of congealed cooking material. While the conditions of treatment may vary over a wide range of time and temperature, the important consideration is that the period of treatment is shorter than the period of time required to effect appreciable cooking of the food at the prevailing temperature. In regard to the cooking material, a large variety of oils and fats can be used, such as, for example, hydrogenated shortening, corn oil, butter, peanut oil, cotton-seed oil, soybean oil, beef fat, lard, etc. The oils can be of the hydrogenated or non-hydrogenated type, or mixtures thereof, just so long as they can be used as cooking materials. In the present invention lower smoking point fats can be used for coating the food without danger of degradation because the coating time is only about 5 to 40 seconds and the coating material is used up very rapidly and is constantly replenished. This is possible because the coating treatment is effected at a temperature of about 110° to 375° F. Beef fat and lard, which are relatively inexpensive, impart excellent flavor to a food, and for that reason they are preferred.

As indicated previously, the food can be coated with browned bread crumbs or other coloring materials either prior to or after immersion in the cooking material. In the case of browned bread crumbs, it is found that such material does have the tendency to fix advantageously the cooking material on the surface of the food. In addition to browned bread crumbs, cereal crumbs, flour, natural carotene powder, mustard, paprika admixed with flour, etc. can be used. The operation by which the food containing cooking material is coated with coloring material is conducted at a temperature at which the food remains in an uncooked condition.

After the food has been coated with the cooking material, with or without coating with the coloring material, it is either frozen or stored. The product can be frozen, for example, at a temperature of about −50° to about 0° F. If the product has been frozen, it can be stored at a temperature of about −5° to about 10° F. Generally, where the food at the start of the treatment is in a frozen condition, it is not necessary to re-freeze because the process of this invention is short in duration and the highest temperature employed in the coating step with cooking material is not enough to cause substantial thawing. This represents an economical advantage of the present process. When the food is initially frozen, after treatment in accordance with this invention, the product is then stored. It should be understood for the purpose of this specification and the appended claims that the expression "freezing the uncooked food" is generic to operations in which the food is frozen initially or at the end of the coating operations. Generally, frozen products in selling establishments are maintained at a temperature of about 0° F. If the product reaches a thawing temperature and it is not properly prepared, as in accordance with this invention, there is a tendency for the natural juices to exude or "bleed" from the product.

In preparing the frozen food product for consumption it is recommended that it be cooked in an oven to a temperature of, for example, from 400° to 450° F. and maintained at that temperature for about 15 to 50 minutes. The prepared food can also be cooked by broiling or in a skillet without the addition of any oil or fat. Thereafter, the food is ready for serving. It is found that although the product of this invention is in an uncooked condition, for example shrimp, it requires essentially the same period of time to cook as it takes in warming or reheating a frozen food product which has been previously cooked. Accordingly, from the standpoint of cooking, there is no disadvantage in using the frozen uncooked product of the present invention.

In order to better understand the present invention, reference will be had to the following examples. However, it should be understood that no undue limitations or restrictions are to be imposed by reason thereof.

*Example 1*

A frozen block of cod fillets was cut into strips of sticks measuring 3¾" x ¾" x ½". The sticks were coated lightly with finely milled flour and then submerged directly into a batter of milk, eggs and seasoning. The batter and flour coated sticks were then dropped into a drum containing browned bread crumbs which adhered to the batter and flour and thus produced a uniform coating of bread crumbs on the fish sticks. The fish sticks were then immersed for five seconds in hydrogenated cotton-seed oil (M.P. 105° F.) at a temperature of 120° F. The fish sticks were immediately packaged and stored at a temperature of about −5° F. (Note that freezing was not necessary.) After the sticks were stored, a portion thereof was removed from their packages and placed in a shallow pan. The pan was put into an oven which had been previously heated to a temperature of 425° F. The sticks were cooked for a 20-minute period without adding any cooking material other than what had been present as a result of the coating operation. The cooked fish had an excellent flavor which was comparable to fresh fish which had been cooked shortly after being caught.

*Example 2*

The same procedure as described hereinabove under Example 1 was applied for processing onions which were to be prepared as French-fried onion rings, except that a second coating with colored flour was applied in place of the bread crumbs. A sample of the frozen onions was cooked at 425° F. for twenty minutes and the finished product contained an excellent taste which was far superior to any product which had been precooked prior to freezing the same for storage purposes.

*Example 3*

In the following experiments, six raw drumsticks of chicken weighing approximately three ounces each were seasoned, coated with flour, dipped in egg batter and then coated with fine crumbs of cornflakes. In the coating operation with an oleaginous material, winterized cottonseed oil was employed. In six separate operations winterized cotton seed oil was maintained at temperatures of 32°, 60°, 130°, 230°, 330° and 375° F., respectively. In each dipping operation a drumstick was immersed in the oil for five seconds, allowed to drain in a wire basket and then placed in a large aluminum pan. The drumsticks coated with winterized cottonseed oil and contained in the aluminum pan were then frozen at a temperature of minus 20° F. The drumsticks were allowed to remain at this temperature for a period of 48 hours. Thereafter, the frozen drumsticks were taken directly from the freezer and placed in an oven which was preheated to 450° F. At this temperature the drumsticks were cooked for a period of 15 minutes, turned over, the temperature then lowered to 400° F. and the drumsticks were cooked for an additional 30 minutes. The six drumsticks had an excellent brown home-cooked color, juicy, and possessed an excellent flavor. No difference could be detected among the various drumsticks as to organoleptic qualities and appearance. It was also noted that the coating operation with the winterized cottonseed oil did not cause evaporation of juices, shrinkage or change of color, and thus it is evident that under the conditions of coating, cooking did not take place.

Having thus described the invention and set forth a specific example of the preferred form thereof, it is pointed out that this specification is to be taken by way of illustration and not of limitation, and that the invention is defined by the appended claims.

I claim:

1. A method of preparing an uncooked food which is ready to be cooked without further preparation which comprises submerging a food selected from the group consisting of onion, potato, meat, fish and poultry in an edible cooking material selected from the group consisting of oil and fat at a temperature at which said cooking material is a liquid and not more than 375° F. for a period of about 5 to about 40 seconds such that said food remains uncooked, and freezing the resultant coated food, whereby the quantity of sealing material coated on the food is sufficient to serve as the cooking medium without the use of additional oleaginous material when the coated food is to be cooked.

2. The method of claim 1 being further characterized by coating the food with an edible material selected from the group consisting of flour and batter prior to submerging the food in the edible cooking material.

3. The method of claim 1 being further characterized by coating the food with an edible material selected from the group consisting of bread crumbs and coloring materials before submerging the food in the edible cooking material.

4. A method of preparing an uncooked food which is ready to be cooked without further preparation which comprises submerging a food selected from the group consisting of onion, potato, meat, fish and poultry in an edible cooking material selected from the group consisting of oil and fat, at a temperature at which said cooking material is a liquid and not more than about 375° F. for a period of about 5 to 40 seconds such that said food remains uncooked and, whereby the quantity of edible cooking material coated on the food is suffiicent to serve as the cooking medium, maintaining the resultant coated food in a frozen state, and then cooking the coated food by the application of heat thereto without the use of additional oleaginous material.

5. The method of claim 4 being further characterized by coating the food with an edible material selected from the group consisting of flour and batter prior to submerging the food in the edible cooking material.

6. The method of claim 4 being further characterized by coating the food with an edible material selected from the group consisting of bread crumbs and coloring materials before submerging the food in the edible cooking material.

7. A method for preparing a frozen poultry product comprising coating a chilled, uncooked poultry part with an uncooked batter, placing a layer of breading material on the batter encased poultry part, said breading material incorporating a quantity of fat, and freezing said part without cooking said batter.

8. A method for preparing a frozen poultry product comprising coating a chilled, uncooked poultry part with an uncooked batter, placing a layer of breading material over the batter covered poultry part, placing a small portion of fat on the surface of said poultry part which has been coated with uncooked batter and with breading material, and freezing the resultant multi-coated poultry part.

9. A method for preparing a frozen poultry product comprising coating a chilled uncooked poultry part with an uncooked batter, placing a layer of bread crumbs over the batter covered poultry part, placing a quantity of butter on the surface of said poultry part which has been coated with uncooked batter and with bread crumbs, and freezing the resultant multi-coated poultry part.

10. A poultry product comprising an uncooked poultry part encased in a coating of uncooked batter, a coating of breading material over said batter coating, and a layer of fat over said batter and breading materials, said poultry part, batter coating, breading material coating and fat layer being in a frozen condition.

11. A poultry product comprising an uncooked poultry part encased in a coating of uncooked batter, a coating of bread crumbs over said batter coating, and a layer of fat over said batter and bread crumbs, said poultry part, batter coating, bread crumb coating and fat layer being in a frozen condition.

12. A poultry product comprising an uncooked poultry part encased in a coating of uncooked batter, a coating of bread crumbs adhering to the batter coated poultry part, a quantity of butter adhering to the said batter and bread crumb coated product, said poultry part uncooked batter coating and bread crumb coating and quantity of butter being in a frozen condition.

13. A poultry product comprising an uncooked poultry part encased in a coating of uncooked batter, a coating of breading material adhering to the batter-coated poultry part, a portion of fat adhering to the surface of said batter and breading material-coated poultry product, said poultry part and uncooked batter coating and breading material and portion of fat being in a frozen condition.

14. A poultry product comprising an uncooked poultry part encased in a coating of uncooked batter, a coating of breading material over said batter coating, said coating of breading material containing fat, said poultry part, batter coating and breading material being in a frozen condition.

15. A method for preparing a frozen food product comprising coating a chilled, uncooked portion of food with an uncooked batter, placing a layer of breading material on the batter encased portion of food, said breading material incorporating a quantity of fat, and freezing said portion of food without cooking said batter.

16. A food product comprising an uncooked portion of food encased in a coating of uncooked batter, a coating of breading material over said batter coating, said coating of breading material containing fat, said portion of food, batter coating and breading material being in a frozen condition.

17. A food product comprising an uncooked portion of food encased in a coating of an edible cooking material selected from the group consisting of oil and fat, said portion of uncooked food encased in edible cooking material being in a frozen condition.

18. A food product comprising an uncooked portion of food encased in a coating of uncooked sealing material, a coating of edible cooking material selected from the group consisting of fat and oil over said sealing material, said portion of uncooked food, sealing material and edible cooking material being in a frozen condition.

References Cited in the file of this patent

UNITED STATES PATENTS

| | | |
|---|---|---|
| 2,653,930 | Dadley | Sep. 29, 1953 |
| 2,724,651 | Hampton et al. | Nov. 22, 1955 |
| 2,819,975 | Letney | Jan. 14, 1958 |
| 2,910,370 | Rogers et al. | Oct. 27, 1959 |
| 2,918,378 | Joiner | Dec. 22, 1959 |

FOREIGN PATENTS

| | | |
|---|---|---|
| 404,871 | Great Britain | Jan. 25, 1934 |

Disclaimer

3,078,172.—*Louis L. Libby*, Forest Hills, N.Y. PREPARED FROZEN FOOD FOR COOKING AND METHOD OF PREPARING THE SAME. Patent dated Feb. 19, 1963. Disclaimer filed Dec. 10, 1979, by the assignee, *Tra-Way Corp.*

Hereby enters this disclaimer to the remaining term of said patent.

[*Official Gazette, March 4, 1980.*]